(12) United States Patent
Li (10) Patent No.: US 10,448,255 B2
(45) Date of Patent: Oct. 15, 2019

(54) RESOURCE ALLOCATION METHOD, TRANSMISSION METHOD, AND APPARATUSES

(71) Applicant: Beijing Zhigu Tech Co., Ltd., Beijing (CN)

(72) Inventor: Yong Li, Beijing (CN)

(73) Assignee: BEIJING ZHIGU TECH CO., LTD., Beijing (CN)

( * ) Notice: Subject to any disclaimer, the term of this patent is extended or adjusted under 35 U.S.C. 154(b) by 65 days.

(21) Appl. No.: 15/234,060

(22) Filed: Aug. 11, 2016

(65) Prior Publication Data

US 2017/0064559 A1    Mar. 2, 2017

(30) Foreign Application Priority Data

Sep. 1, 2015   (CN) .......................... 2015 1 0552517

(51) Int. Cl.
*H04W 72/04* (2009.01)
*H04W 16/14* (2009.01)
*H04W 74/08* (2009.01)

(52) U.S. Cl.
CPC ....... *H04W 16/14* (2013.01); *H04W 72/0453* (2013.01); *H04W 72/042* (2013.01); *H04W 74/0808* (2013.01)

(58) Field of Classification Search
CPC ............. H04W 16/14; H04W 72/0453; H04W 74/0808; H04W 72/042
See application file for complete search history.

(56) References Cited

U.S. PATENT DOCUMENTS

2012/0250631 A1   10/2012  Hakola et al.
2014/0378157 A1   12/2014  Wei et al.
(Continued)

FOREIGN PATENT DOCUMENTS

CN          103765824 A      4/2014

OTHER PUBLICATIONS

Electronics and Telecommunications Research Institute (ETRI), "Discussion on Carrier Selection in LAA," 3rd Generation Partnership Project (3GPP) TSG RAN WG2 Meeting #89bis, Document No. R2-151292, Apr. 20, 2015.
(Continued)

*Primary Examiner* — Phuc H Tran
(74) *Attorney, Agent, or Firm* — Sheppard Mullin Richter & Hampton LLP (57) ABSTRACT

Embodiments of the present invention disclose a resource allocation method, a transmission method, and apparatuses. The resource allocation method comprises: sending a scheduling instruction, wherein the scheduling instruction is used to instruct a user equipment to prepare for transmission; determining an available carrier in an unlicensed spectrum; and sending a resource allocation message in response to that an available carrier exists, wherein the resource allocation message is used to instruct to allocate the available carrier to the transmission of the user equipment. According to the method and apparatus of the embodiments of the present invention, after an available carrier is determined, a resource allocation message is sent again to explicitly inform a user equipment of the available transmission resource, thereby avoiding the problem of resource unavailability and/or resource waste caused by the unpredictability of whether an unlicensed spectrum is available.

18 Claims, 7 Drawing Sheets

(56) References Cited

U.S. PATENT DOCUMENTS

2016/0050667 A1* 2/2016 Papasakellariou ..........................
.......................................................... H04W 74/0808
.......................................................... 370/329
2016/0278078 A1* 9/2016 Cheng ............... H04W 72/0446
2017/0230970 A1* 8/2017 Kim ................... H04W 72/0446
2017/0311337 A1* 10/2017 Mo ....................... H04W 72/12

OTHER PUBLICATIONS

Electronics and Telecommunications Research Institute (ETRI), "Discussion on the UL LBT FOR LAA," 3rd Generation Partnership Project (3GPP) TSG RAN WG1 Meeting #81, Document No. R1-153001, May 25, 2015.

* cited by examiner

RESOURCE ALLOCATION METHOD, TRANSMISSION METHOD, AND APPARATUSES

TECHNICAL FIELD

The present invention relates to the field of communications technologies, and in particular, to a resource allocation method, a transmission method, and apparatuses.

BACKGROUND

Licensed spectra, that is, wireless spectra that operators are authorized to use as regulated by the laws of various countries, can be used only by those having a license and authorization and having passed the network entry test. Unlicensed spectra, for example, working frequency bands of WiFi and Bluetooth devices, can be used without authorization from the government. Because the shortage of licensed spectrum resources allocated to mobile communication restricts the development scale of mobile communications networks in the future, combining licensed spectra with the large number of unlicensed spectra to improve the transmission capacity of mobile networks is currently being considered. Statistics indicate that currently in the 5 GHz frequency band, unlicensed spectrum resources that have been allocated in various countries may exceed 500 MHz in total. These unlicensed WiFi spectra have attracted attention from mobile communications equipment vendors, mobile network operators and so on. Accordingly, solutions such as LTE-U (Unlicensed LTE, Unlicensed LTE) emerge, and the launch of projects for testing the Unlicensed LTE technology was recently announced. The license assisted access (License Assisted Access, LAA) technology that the international standardization organization 3GPP is currently studying is a typical solution of expanding the capacity of mobile communications systems by using unlicensed spectra, which allows an LTE system to use unlicensed spectra to further improve the transmission capacity of the LTE system.

In an LAA system, a base station may use an unlicensed spectrum to increase the user throughput and the system capacity. However, because multiple systems share a same unlicensed spectrum, a conventional contention mechanism is generally adopted to determine how to use the unlicensed spectrum, in order to enable the systems to have the same opportunity to access the unlicensed spectrum. Using uplink scheduling of the LAA system as an example, a mainstream implementation method that is proposed at present is as follows: A base station first schedules some user equipment (User Equipment, UE) at a scheduling moment, and determines, in a scheduling instruction (UL Grant), information such as a time-frequency resource occupied by a user and a transmission format, to instruct the user equipment to prepare for uplink transmission. After several frames, the base station performs clear channel assessment (Clear Channel Assessment, CCA) to determine whether a current channel is in a busy or idle state, and when the channel is idle, sends a physical layer signal (for example, a reservation signal (Reservation Signal)) to occupy the channel. At a next transmission moment, the user equipment sends uplink data according to the time-frequency resource, the transmission format and the like that are indicated by the base station. It can be seen that different from a conventional mobile communications system using a licensed spectrum, the LAA base station cannot determine, at the scheduling moment, whether an unlicensed carrier is available at the transmission moment after several frames that is indicated by the scheduling instruction, that is, whether the unlicensed spectrum is available is unpredictable.

Figure 1:
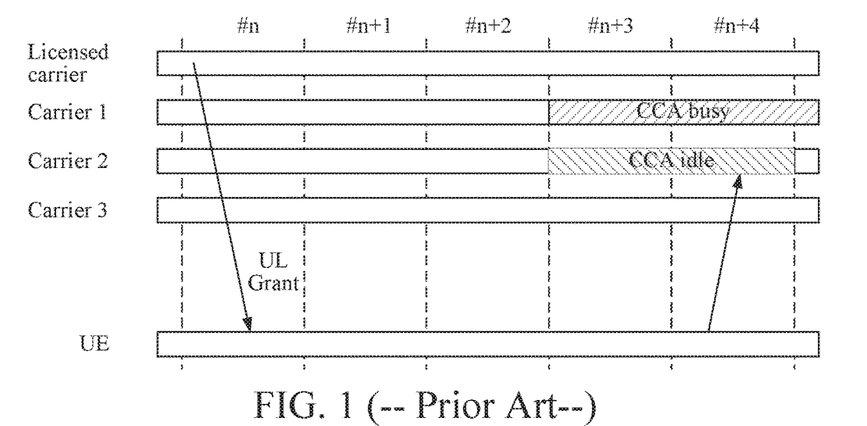
FIG. 1 is a schematic diagram of an uplink scheduling process of a conventional LAA system.

As shown in FIG. 1, the base station schedules a user equipment (User Equipment, UE) by using a scheduling instruction (UL Grant) in the $n^{th}$ subframe, wherein it is indicated in the UL Grant that a carrier resource allocated to the user equipment is a carrier 2, and it is also determined in the UL Grant that information such as a format used for transmission, to instruct the user equipment to prepare for uplink transmission. In the $(n+3)^{th}$ subframe, the base station performs clear channel assessment to determine whether a current channel is in a busy or idle state, preempts the idle carrier 2, and sends a Reservation Signal on the carrier 2 to occupy the channel. Then, in the $(n+4)^{th}$ subframe, the user equipment sends uplink data on the carrier 2 according to the transmission format indicated by the base station. However, if the base station fails to preempt the carrier 2, there will be no available transmission resource for the user equipment at the transmission moment; or if the base station has preempted a carrier 3 but does not allocate the carrier 3 to the user equipment at the scheduling moment, the resource is wasted.

SUMMARY

In view of this, an objective of embodiments of the present invention is to provide a resource allocation solution that can avoid the problem of resource shortage and/or resource waste caused by the unpredictability of whether an unlicensed spectrum is available.

To achieve the above objective, according to a first aspect of the embodiments of the present invention, a resource allocation method is provided, the method comprising:

sending a scheduling instruction, wherein the scheduling instruction is used to instruct a user equipment to prepare for transmission;

determining an available carrier in an unlicensed spectrum; and sending a resource allocation message in response to that an available carrier exists, wherein the resource allocation message is used to instruct to allocate the available carrier to the transmission of the user equipment.

According to a second aspect of the embodiments of the present invention, a transmission method is provided, the method comprising:

acquiring a scheduling instruction, wherein the scheduling instruction is used to instruct a user equipment to prepare for transmission;

acquiring a resource allocation message, wherein the resource allocation message is used to indicate an available carrier allocated to the transmission of the user equipment; and performing, in response to the resource allocation message, the transmission on the available carrier according to at least the scheduling instruction.

According to a third aspect of the present invention, a resource allocation apparatus is provided, the apparatus comprising:

a first sending module, configured to send a scheduling instruction, wherein the scheduling instruction is used to instruct a user equipment to prepare for transmission;

a first determining module, configured to determine an available carrier in an unlicensed spectrum; and a first allocation module, configured to send a resource allocation message in response to that an available carrier exists, wherein the resource allocation message is used to instruct to allocate the available carrier to the transmission of the user equipment.

According to a fourth aspect of the present invention, a transmission apparatus is provided, the apparatus comprising:

a first acquiring module, configured to acquire a scheduling instruction, wherein the scheduling instruction is used to instruct a user equipment to prepare for transmission;

a second acquiring module, configured to acquire a resource allocation message, wherein the resource allocation message is used to indicate an available carrier allocated to the transmission of the user equipment; and a transmission module, configured to perform, in response to the resource allocation message, the transmission on the available carrier according to at least the scheduling instruction.

According to a fifth aspect of the present invention, a resource allocation apparatus is provided, the apparatus comprising:

a first acquiring module, configured to acquire a scheduling instruction, wherein the scheduling instruction is used to instruct a user equipment to prepare for transmission;

a second acquiring module, configured to acquire a resource allocation message, wherein the resource allocation message is used to indicate an available carrier allocated to the transmission of the user equipment; and a transmission module, configured to perform, in response to the resource allocation message, the transmission on the available carrier according to at least the scheduling instruction.

According to a sixth aspect of the present invention, a transmission apparatus is provided, the apparatus comprising:

a transceiver;

a memory, configured to store an instruction; and a processor, configured to execute the instruction stored in the memory, wherein the instruction causes the processor to execute the following steps:

acquiring a scheduling instruction by using the transceiver, wherein the scheduling instruction is used to instruct a user equipment to prepare for transmission;

acquiring a resource allocation message by using the transceiver, wherein the resource allocation message is used to indicate an available carrier allocated to the transmission of the user equipment; and performing, in response to the resource allocation message, the transmission on the available carrier by using the transceiver according to at least the scheduling instruction.

According to the method and apparatus of the embodiments of the present invention, after an available carrier is determined, a resource allocation message is sent again to explicitly inform a user equipment of the available transmission resource, thereby avoiding the problem of resource unavailability and/or resource waste caused by the unpredictability of whether an unlicensed spectrum is available.

DETAILED DESCRIPTION

The following further describes specific implementation manners of the present invention in detail with reference to the accompanying drawings and embodiments. The following embodiments are used for describing the present invention, rather than limiting the scope of the present invention.

A person skilled in the art may understand that, terms such as "first" and "second" in the present invention are merely used to distinguish different devices, modules, parameters or the like, and neither represent any specific technical meanings, nor represent any necessary logic sequence between the steps, devices, modules, or the like.

Figure 2A:
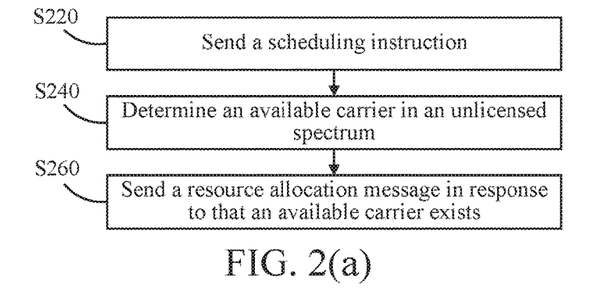
FIG. 2(a) is a flowchart of an example of a resource allocation method according to an embodiment of the present invention.

FIG. 2(a) is a flowchart of an example of a resource allocation method provided by an embodiment of the present invention. The method may be executed by a base station side. As shown in FIG. 2(a), the method comprises:

S220. Send a scheduling instruction, wherein the scheduling instruction is used to instruct a user equipment to prepare for transmission.

S240. Determine an available carrier in an unlicensed spectrum.

S260. Send a resource allocation message in response to that an available carrier exists, wherein the resource allocation message is used to instruct to allocate the available carrier to the transmission of the user equipment.

In the method of this embodiment, after an available carrier is determined, a resource allocation message is sent again to explicitly inform a user equipment of the available transmission resource, thereby avoiding the problem of resource unavailability and/or resource waste caused by the unpredictability of whether an unlicensed spectrum is available.

Specifically, in the step S240, the available carrier may be determined in the unlicensed spectrum by means of clear channel assessment.

In a possible implementation manner, the scheduling instruction may not comprise: information that is associated with a carrier allocated to the transmission of the user equipment. That is, the scheduling instruction does not indicate, to the user equipment, a carrier resource allocated thereto, but only comprises, for example, a transmission format and other information used for preparing for transmission. In this implementation manner, the resource allocation message may comprise: information that is associated with the available carrier allocated to the transmission of the user equipment, that is, the resource allocation message explicitly indicates a physical carrier available for transmission of the user equipment. The resource allocation message is sent after the base station determines the available resource. Therefore, an explicitly available carrier resource can be allocated to the user equipment by using the method of this embodiment.

In another possible implementation manner, the scheduling instruction may comprise: information that is associated with a logical carrier allocated to the transmission of the user equipment; and the resource allocation message comprises: information that is associated with a correspondence between the available carrier and the logical carrier. Optionally, in the method of this embodiment, a logical number is set for an unlicensed spectrum, a logical number of a logical carrier allocated to the user equipment is indicated in the scheduling instruction, and after the available carrier is preempted, a resource allocation message is used to inform the user equipment of information associated with a correspondence between the available carrier and the logical carrier. For example, the logical number of the logical carrier is sent on the available carrier to indicate that the available carrier corresponds to the logical carrier corresponding to the logical number. Using uplink transmission shown in FIG. 2(b) as an example, the base station indicates, in a UL Grant, that a logical carrier 1 is allocated to the user equipment, determines that a carrier 2 is available by means of CCA, uses a reservation signal to occupy the carrier 2, and then uses a resource allocation message to inform the user equipment of a correspondence between the logical carrier 1 and the available carrier 2. The resource allocation message is a logical number 1 of the logical carrier 1, so that the user equipment can perform transmission on the carrier 2 at a transmission moment.

A logical carrier is allocated to a user equipment in a scheduling instruction, so that the user equipment can prepare to-be-sent data according to at least a transmission format indicated in the scheduling instruction, and after receiving a resource allocation message, modulate the data eventually onto the indicated physical available carrier by using a simple frequency shifting operation. Therefore, no significant time delay is caused, and a timing relationship of subsequent transmission moments is not affected. In addition, the use of the logical carrier number in the scheduling instruction does not change the format of a conventional scheduling instruction.

It should be noted that any logical number may be set for the logical carrier. In a possible implementation manner, logical numbers may be set for unlicensed carriers depending on the transmission performance, bearer types and the like of the unlicensed carriers, so as to map the unlicensed carriers to priorities and/or service requirements of the user equipment. Optionally, the logical number in the method of this embodiment may represent a transmission priority of the user equipment. In this implementation manner, the method of this embodiment further comprises:

S210. Allocate the logical carrier to the user equipment according to at least a transmission requirement. For example, a carrier in a relatively high or low frequency band is allocated according to different types of data to be transmitted.

In addition, to further reduce signaling overheads, in a possible implementation manner, the resource allocation message may be placed in a physical indication signal that is used to occupy the available carrier. That is, the method of this embodiment further comprises:

S230. Send a physical indication signal on the available carrier, wherein the physical indication signal is used to occupy the available carrier.

In this way, in the step S240, the resource allocation message can be included in the physical indication signal.

It should also be noted that the sending of the resource allocation message occurs before a preset subframe after the scheduling instruction is sent, wherein the preset subframe is a moment at which the user equipment is ready for transmission, and is, for example, the fourth subframe after the scheduling instruction. A suitable time for sending the resource allocation message may be determined according to a possible resource allocation form (for example, in the implementation manner where the logical carrier is allocated, it takes a short time for the user equipment to modulate the to-be-transmitted data onto an available physical carrier), so as not to affect the timing relationship of subsequent transmission moments.

Based on the above, the method of this embodiment can alleviate the problem of resource unavailability or resource waste.

Figure 3:
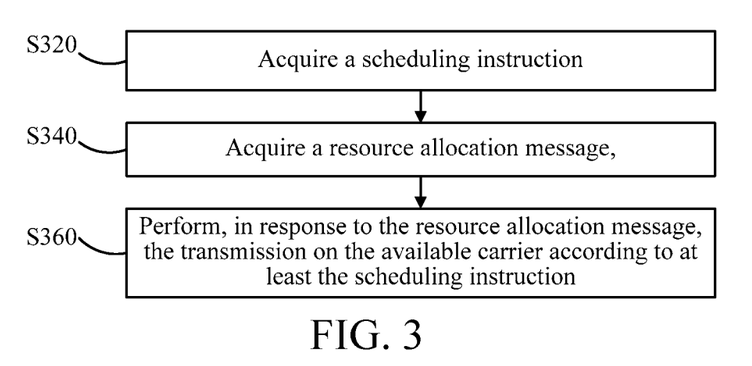
FIG. 3 is a flowchart of an example of a transmission method according to an embodiment of the present invention.

FIG. 3 is a flowchart of an example of a transmission method provided by an embodiment of the present invention. The method may be executed by any user equipment. As shown in FIG. 3, the method comprises:

S320. Acquire a scheduling instruction, wherein the scheduling instruction is used to instruct a user equipment to prepare for transmission.

S340. Acquire a resource allocation message, wherein the resource allocation message is used to indicate an available carrier allocated to the transmission of the user equipment; and S360. Perform, in response to the resource allocation message, the transmission on the available carrier according to at least the scheduling instruction.

As described with reference to FIG. 2(a), in the method of this embodiment, after receiving a scheduling instruction, the user equipment can prepare for transmission according to the scheduling instruction. Specifically, in a possible implementation manner, the scheduling instruction may not comprise: information that is associated with a carrier allocated to the transmission of the user equipment. That is, the scheduling instruction does not indicate, to the user equipment, a carrier resource allocated thereto, but only comprises, for example, a transmission format and other information used for preparing for transmission. In this implementation manner, in the method of this embodiment, data may be prepared according to only the information included in the scheduling instruction, but an actually available carrier is not known. If the resource allocation message is acquired in the step S340, a carrier resource that can be used is determined in the step S360 according to the information associated with the available carrier allocated to the transmission of the user equipment, which is comprised in the resource allocation message. Because the resource allocation message is sent after the base station determines the available resource, an explicitly available carrier resource can be used for transmission in the method of this embodiment. If such resource allocation information is not acquired in the step S340, the prepared transmission is not performed in the method of this embodiment.

In another possible implementation manner, the scheduling instruction may comprise: information that is associated with a logical carrier allocated to the transmission of the user equipment; and the resource allocation message comprises: information that is associated with a correspondence between the available carrier and the logical carrier. In this implementation manner, if the resource allocation message is acquired in the step S340, a carrier resource that can be used is determined according to the correspondence between the available carrier and the logical carrier that is comprised in the resource allocation message, and for example, the data is modulated eventually onto the indicated physical available carrier by using a simple frequency shifting operation. Because the resource allocation message is sent after the base station determines the available resource, an explicitly available carrier resource can be used for transmission in the method of this embodiment. If such resource allocation information is not acquired in the step S340, the prepared transmission is not performed in the method of this embodiment.

Still as described with reference to FIG. 2(a), to further reduce signaling overheads, in a possible implementation manner, the resource allocation message is placed in a physical indication signal that is used to occupy the available carrier, and then sent. In this implementation manner, the step S340 may further comprise:

S342. Receive a physical indication signal associated with an unlicensed spectrum, wherein the physical indication signal is used to occupy the available carrier.

Each user equipment in an LAA system can listen for a possible physical indication signal on a particular frequency band, and according to different configurations of the LAA system, the particular frequency band may be an entire frequency band or a partial frequency band of one or more carriers in an unlicensed spectrum, which may be configured in advance for the user equipment by using higher-layer signaling (for example, RRC (Radio Resource Control, Radio Resource Control) signaling).

S344. Parse the physical indication signal to obtain the resource allocation message.

Optionally, the information associated with the correspondence between the available carrier and the logical carrier may be a logical number of the logical carrier corresponding to the available carrier. From a physical indication signal obtained by listening on a physical available carrier, a logical number of the logical carrier is parsed out, which corresponds to that a user equipment to which the logical number is indicated in the scheduling instruction should perform transmission by using the corresponding available carrier.

Based on the above, the method of this embodiment can make full use of unlicensed spectrum resources to perform transmission without being affected by the unpredictability of whether an unlicensed spectrum is available.

A person skilled in the art may understand that, in the foregoing method of specific implementation manners of the present invention, sequence number of each step does not imply an execution sequence, and an execution sequence of each step should be determined according to its function and internal logic, rather than limiting an implementation process of the implementation manners of the present invention.

Figure 2B:
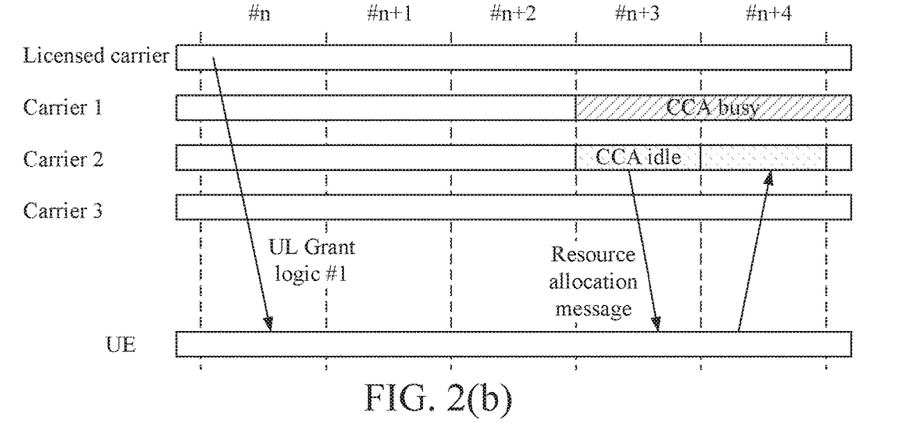
FIG. 2(b) is a schematic diagram of a process of performing uplink scheduling in a resource allocation method according to an embodiment of the present invention.

In addition, an embodiment of the present invention further provides a computer readable medium, comprising a computer readable instruction, wherein when the computer readable instruction is executed, the following operations are performed: executing the operations of the steps of the method in the above embodiment shown in FIG. 2.

In addition, an embodiment of the present invention further provides a computer readable medium, comprising a computer readable instruction, wherein when the computer readable instruction is executed, the following operations are performed: executing the operations of the steps of the method in the above embodiment shown in FIG. 3.

Figure 4A:
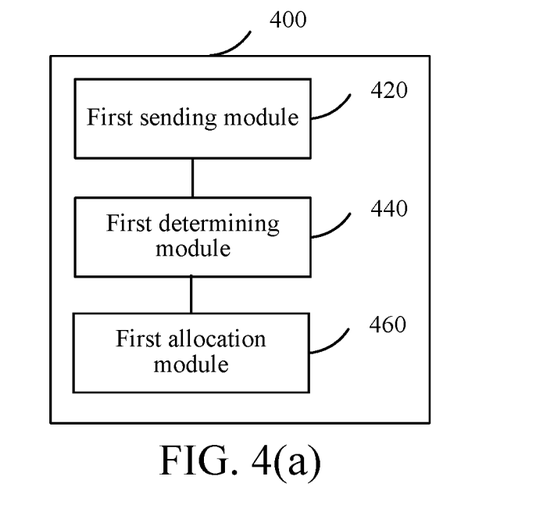
FIG. 4(a) to FIG. 4(c) are structural block diagrams of multiple examples of a resource allocation apparatus according to an embodiment of the present invention.

FIG. 4(a) is a structural block diagram of an example of a resource allocation apparatus of an embodiment of the present invention. The apparatus may be or may belong to any base station. As shown in FIG. 4(a), the resource allocation apparatus 400 of this embodiment of the present invention comprises:

a first sending module 420, configured to send a scheduling instruction, wherein the scheduling instruction is used to instruct a user equipment to prepare for transmission;

a first determining module 440, configured to determine an available carrier in an unlicensed spectrum; and a first allocation module 460, configured to send a resource allocation message in response to that an available carrier exists, wherein the resource allocation message is used to instruct to allocate the available carrier to the transmission of the user equipment.

In the apparatus of this embodiment, after an available carrier is determined, a resource allocation message is sent again to explicitly inform a user equipment of the available transmission resource, thereby avoiding the problem of resource unavailability and/or resource waste caused by the unpredictability of whether an unlicensed spectrum is available.

Specifically, the first determining module 440 may determine the available carrier in the unlicensed spectrum by means of clear channel assessment.

In a possible implementation manner, the scheduling instruction may not comprise: information that is associated with a carrier allocated to the transmission of the user equipment. That is, the scheduling instruction does not indicate, to the user equipment, a carrier resource allocated thereto, but only comprises, for example, a transmission format and other information used for preparing for transmission. In this implementation manner, the resource allocation message may comprise: information that is associated with the available carrier allocated to the transmission of the user equipment. The resource allocation message is sent after the base station determines the available resource. Therefore, the apparatus of this embodiment can allocate an explicitly available carrier resource to the user equipment.

In another possible implementation manner, the scheduling instruction may comprise: information that is associated with a logical carrier allocated to the transmission of the user equipment; and the resource allocation message comprises: information that is associated with a correspondence between the available carrier and the logical carrier. Optionally, the apparatus of this embodiment sets a logical number for an unlicensed spectrum, indicates, in the scheduling instruction, a logical number of a logical carrier allocated to the user equipment, and after preempting the available carrier, uses a resource allocation message to inform the user equipment of information associated with a correspondence between the available carrier and the logical carrier. For example, the logical number of the logical carrier is sent on the available carrier to indicate that the available carrier corresponds to the logical carrier corresponding to the logical number. Using uplink transmission shown in FIG. 2(b) as an example, the base station indicates, in a UL Grant, that a logical carrier 1 is allocated to the user equipment, determines that a carrier 2 is available by means of CCA, uses a reservation signal to occupy the carrier 2, and then uses a resource allocation message to inform the user equipment of a correspondence between the logical carrier 1 and the available carrier 2. The resource allocation message is a logical number 1 of the logical carrier 1, so that the user equipment can perform transmission on the carrier 2 at a transmission moment.

A logical carrier is allocated to a user equipment in a scheduling instruction, so that the user equipment can prepare to-be-sent data according to at least a transmission format indicated in the scheduling instruction, and after receiving a resource allocation message, modulate the data eventually onto the indicated physical available carrier by using a simple frequency shifting operation. Therefore, no significant time delay is caused, and a timing relationship of subsequent transmission moments is not affected. In addition, the use of the logical carrier number in the scheduling instruction does not change the format of a conventional scheduling instruction.

Figure 4B:
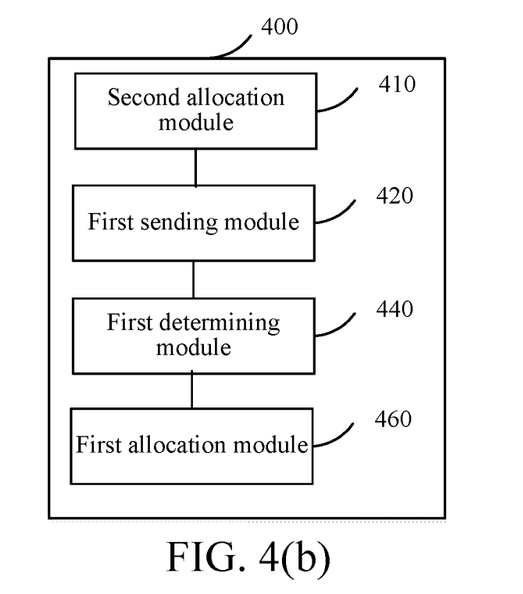

It should be noted that any logical number may be set for the logical carrier. In a possible implementation manner, logical numbers may be set for unlicensed carriers depending on the transmission performance, bearer types and the like of the unlicensed carriers, so as to map the unlicensed carriers to priorities and/or service requirements of the user equipment. Optionally, the logical number in the apparatus of this embodiment may represent a transmission priority of the user equipment. In this implementation manner, as shown in FIG. 4(b), the apparatus 400 of this embodiment further comprises:

a second allocation module 410, configured to allocate the logical carrier to the user equipment according to at least a transmission requirement. For example, a carrier in a relatively high or low frequency band is allocated according to different types of data to be transmitted.

Figure 4C:
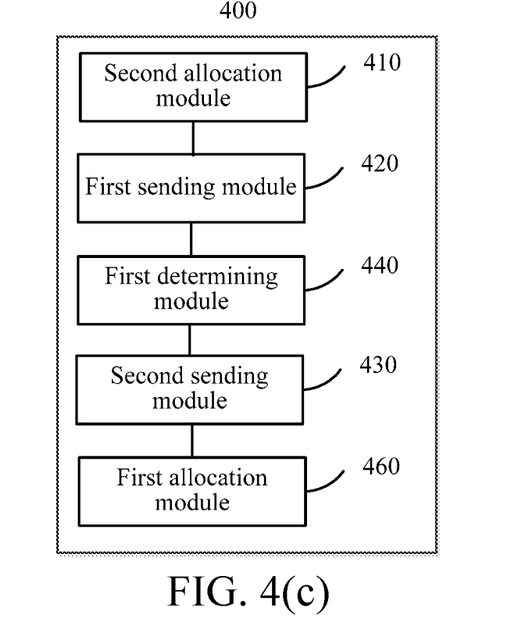

In addition, to further reduce signaling overheads, in a possible implementation manner, the resource allocation message may be placed in a physical indication signal that is used to occupy the available carrier. That is, as shown in FIG. 4(c), the apparatus 400 of this embodiment further comprises:

a second sending module 430, configured to send a physical indication signal on the available carrier, wherein the physical indication signal is used to occupy the available carrier.

In this way, the first allocation module 460 can include the resource allocation message in the physical indication signal.

It should also be noted that the sending of the resource allocation message occurs before a preset subframe after the scheduling instruction is sent, wherein the preset subframe is a moment at which the user equipment is ready for transmission, and is, for example, the fourth subframe after the scheduling instruction. A suitable time for sending the resource allocation message may be determined according to a possible resource allocation form (for example, in the implementation manner where the logical carrier is allocated, it takes a short time for the user equipment to modulate the to-be-transmitted data onto an available physical carrier), so as not to affect the timing relationship of subsequent transmission moments.

Based on the above, the apparatus of this embodiment can alleviate the problem of resource unavailability or resource waste.

Figure 5A:
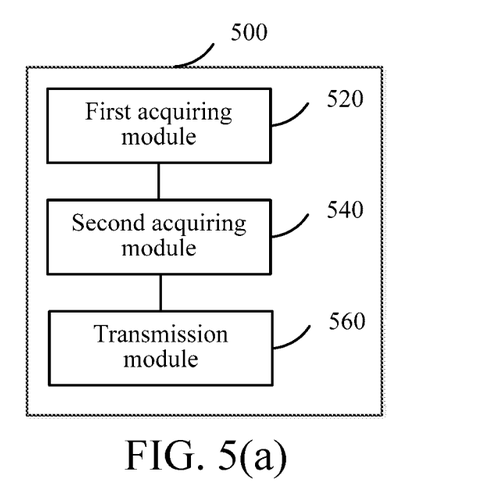
FIG. 5(a) and FIG. 5(b) are structural block diagrams of multiple examples of a transmission apparatus according to an embodiment of the present invention.

FIG. 5(a) is a structural block diagram of an example of a transmission apparatus of an embodiment of the present invention. The apparatus may be or may belong to any user equipment. As shown in FIG. 5(a), the apparatus 500 comprises:

a first acquiring module 520, configured to acquire a scheduling instruction, wherein the scheduling instruction is used to instruct a user equipment to prepare for transmission;

a second acquiring module 540, configured to acquire a resource allocation message, wherein the resource allocation message is used to indicate an available carrier allocated to the transmission of the user equipment; and a transmission module 560, configured to perform, in response to the resource allocation message, the transmission on the available carrier according to at least the scheduling instruction.

As described with reference to FIG. 4(a) to FIG. 4(c), after receiving a scheduling instruction, the apparatus of this embodiment can prepare for transmission according to the scheduling instruction. Specifically, in a possible implementation manner, the scheduling instruction may not comprise: information that is associated with a carrier allocated to the transmission of the user equipment. That is, the scheduling instruction does not indicate, to the user equipment, a carrier resource allocated thereto, but only comprises, for example, a transmission format and other information used for preparing for transmission. In this implementation manner, the apparatus of this embodiment may prepare data according to only the information included in the scheduling instruction, but does not know an actually available carrier resource. If the second acquiring module 540 acquires the resource allocation message, the transmission module 560 can determine a carrier resource that can be used according to the information associated with the available carrier allocated to the transmission of the user equipment, which is comprised in the resource allocation message. Because the resource allocation message is sent after the base station determines the available resource, the apparatus of this embodiment can use an explicitly available carrier resource for transmission. If the second acquiring module 540 does not acquire such resource allocation information, the apparatus of this embodiment does not perform the prepared transmission.

In another possible implementation manner, the scheduling instruction may comprise:

information that is associated with a logical carrier allocated to the transmission of the user equipment; and the resource allocation message comprises: information that is associated with a correspondence between the available carrier and the logical carrier. In this implementation manner, if the second acquiring module 540 acquires the resource allocation message, a carrier resource that can be used is determined according to the correspondence between the available carrier and the logical carrier that is comprised in the resource allocation message, and for example, the data is modulated eventually onto the indicated physical available carrier by using a simple frequency shifting operation. Because the resource allocation message is sent after the base station determines the available resource, the apparatus of this embodiment can use an explicitly available carrier resource for transmission. If the second acquiring module 540 does not acquire such resource allocation information, the apparatus of this embodiment does not perform the prepared transmission.

Figure 5B:
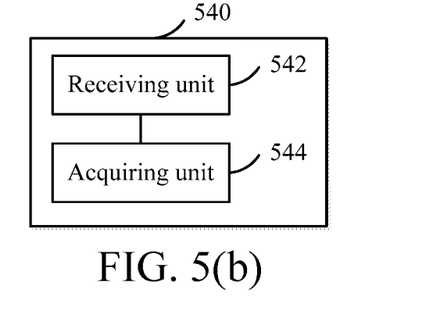

Still as described with reference to FIG. 4(a) to FIG. 4(c), to further reduce signaling overheads, in a possible implementation manner, the resource allocation message is placed in a physical indication signal that is used to occupy the available carrier, and then sent. In this implementation manner, as shown in FIG. 5(b), the second acquiring module 540 may further comprise: a receiving unit 542 and an acquiring unit 544.

The receiving unit 542 is configured to receive a physical indication signal associated with an unlicensed spectrum, wherein the physical indication signal is used to occupy the available carrier.

Each user equipment in an LAA system can listen for a possible physical indication signal on a particular frequency band, and according to different configurations of the LAA system, the particular frequency band may be an entire frequency band or a partial frequency band of one or more carriers in an unlicensed spectrum, which may be configured in advance for the user equipment by using higher-layer signaling (for example, RRC (Radio Resource Control, Radio Resource Control) signaling).

The acquiring unit 544 is configured to parse the physical indication signal to obtain the resource allocation message.

Optionally, the information associated with the correspondence between the available carrier and the logical carrier may be a logical number of the logical carrier corresponding to the available carrier. From a physical indication signal obtained by listening on a physical available carrier, a logical number of the logical carrier is parsed out, which corresponds to that a user equipment to which the logical number is indicated in the scheduling instruction should perform transmission by using the corresponding available carrier.

Based on the above, the apparatus of this embodiment can make full use of unlicensed spectrum resources to perform transmission without being affected by the unpredictability of whether an unlicensed spectrum is available.

The method and apparatus of the embodiments of the present invention are further described below through specific examples.

Figure 6:
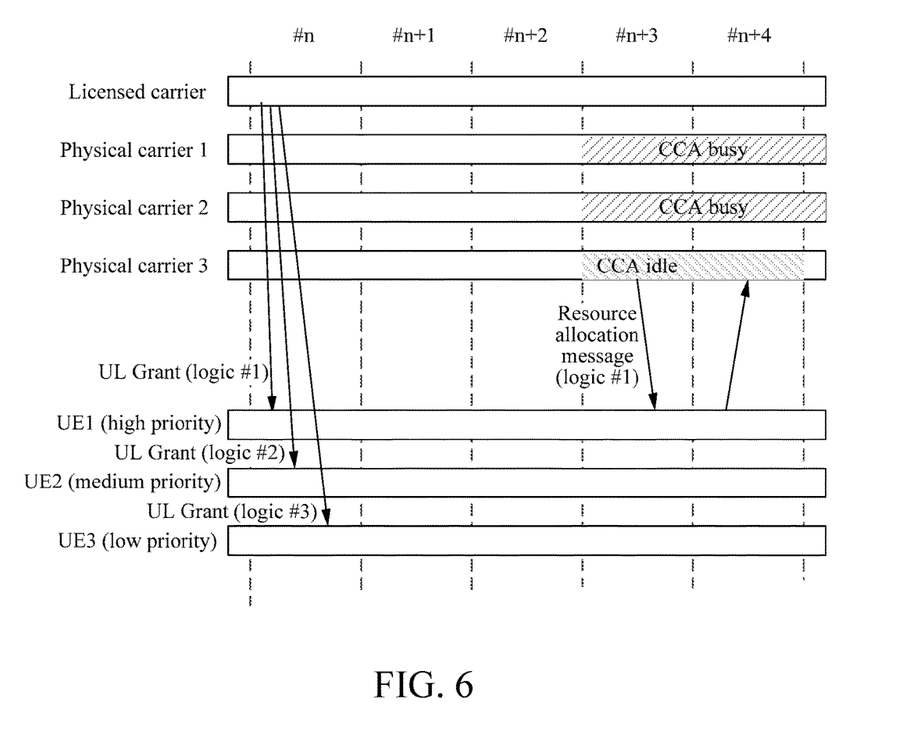
FIG. 6 is a schematic diagram of an application scenario of an example of the method and apparatus of the embodiments of the present invention.

As shown in FIG. 6, a base station sends a UL Grant to user equipment 1, 2, and 3 in the $n^{th}$ subframe respectively, and instructs the user equipment to use logical carriers 1, 2, and 3 respectively for uplink transmission, wherein the user equipment 1, 2, and 3 respectively have a high, medium, and low priority. In the $(n+3)^{th}$ subframe, the base station determines the availability of the unlicensed carriers 1, 2, and 3 by means of CAA, determines that the physical carriers 1 and 2 are busy and the physical carrier 3 is idle, and then sends a reservation signal on the physical carrier 3 to occupy the physical carrier 3. In other words, the base station fails to obtain the physical carriers 1 and 2 through contention but successfully obtains the physical carrier 3 through contention. When the reservation signal is sent, the identifier of the logical carrier 1, that is, the physical carrier number 1, is placed therein. The user equipment 1 obtains the reservation signal by listening and identifies the logical carrier number 1, and sends data on the physical carrier 3 in the $(n+4)^{th}$ subframe. The user equipment 2 and 3 do not receive the logical carrier identifiers 2 and 3, and do not send data in the $(n+4)^{th}$ subframe.

Figure 7:
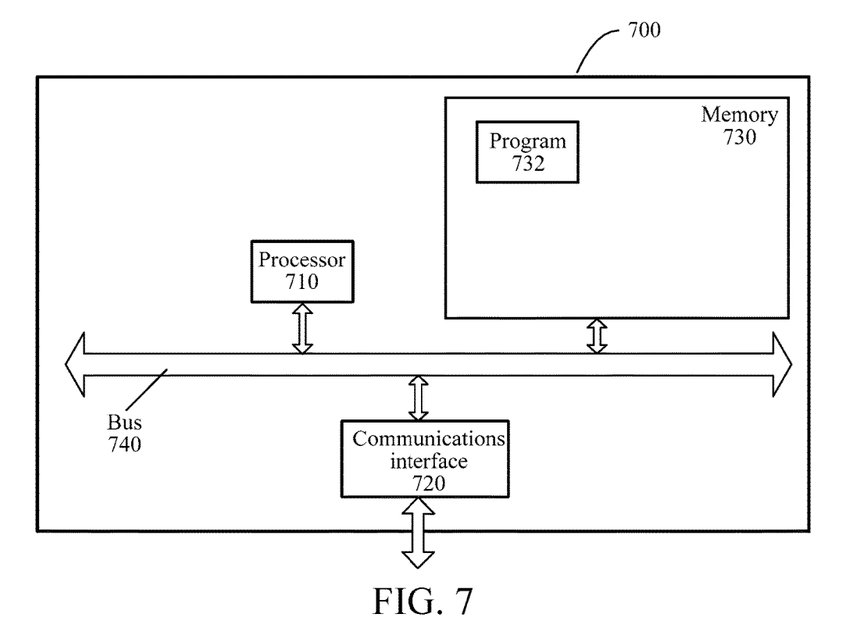
FIG. 7 is a structural block diagram of another example of a resource allocation apparatus according to an embodiment of the present invention.

FIG. 7 is a schematic structural diagram of still another example of a resource allocation apparatus provided by an embodiment of the present invention, and this specific embodiment of the present invention does not limit a specific implementation of the resource allocation apparatus. As shown in FIG. 7, the resource allocation apparatus 700 may include:

a processor (processor) 710, a communications interface (Communications interface) 720, a memory (memory) 730, and a communications bus 740.

The processor 710, the communications interface 720, and the memory 730 implement communication between each other through the communications bus 740.

The communications interface 720 is configured to communicate with a network element such as a client.

The processor 710 is configured to execute a program 732, and specifically may execute related steps in the method embodiment shown in FIG. 2(a).

Specifically, the program 732 may include program code, where the program code includes a computer operation instruction.

The processor 710 may be a central processing unit CPU, or an application-specific integrated circuit ASIC (Application Specific Integrated Circuit), or one or more integrated circuits configured to implement the embodiments of the present invention.

The memory 730 is configured to store the program 732. The memory 730 may include a high-speed RAM memory, and may also include a non-volatile memory (non-volatile memory), for example, at least one magnetic disk storage. The program 732 may be specifically configured to cause the resource allocation apparatus 700 to execute the following steps:

sending a scheduling instruction, wherein the scheduling instruction is used to instruct a user equipment to prepare for transmission;

determining an available carrier in an unlicensed spectrum; and sending a resource allocation message in response to that an available carrier exists, wherein the resource allocation message is used to instruct to allocate the available carrier to the transmission of the user equipment.

For the specific implementation of the steps in the program 732, refer to corresponding descriptions in the foregoing embodiments of corresponding steps and units, and details are not described herein again. It may be clearly understood by a person skilled in the art that, for the purpose of convenient and brief description, for a detailed working process of the foregoing device and module, refer to a corresponding process in the foregoing method embodiments, and details are not described herein again.

A person skilled in the art may clearly know that, for convenient and brief description, for the specific operating process of the foregoing device and module, reference may be made to the corresponding descriptions in the foregoing device embodiment, and no further details are provided herein.

Figure 8:
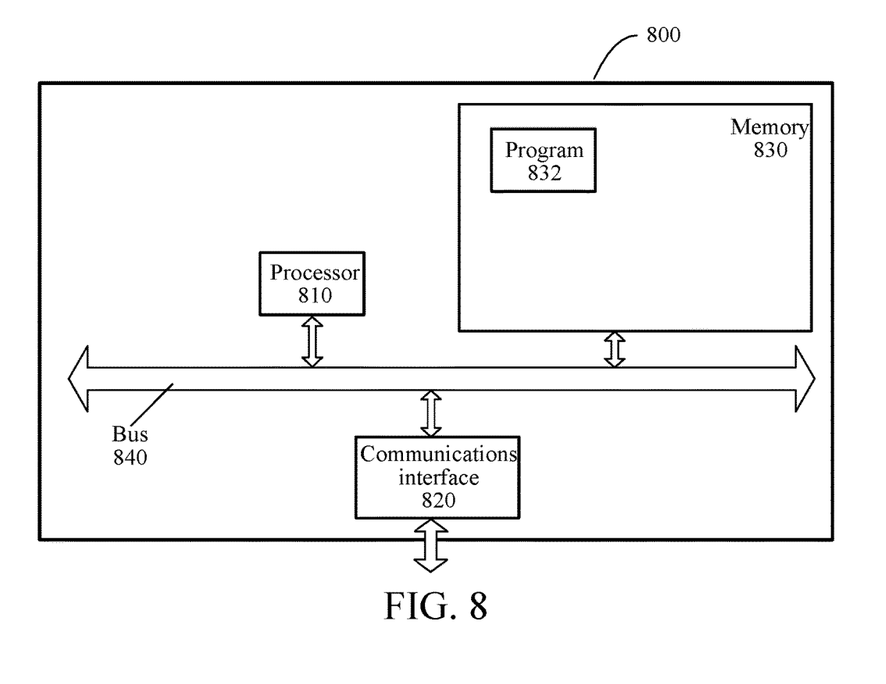
FIG. 8 is a structural block diagram of another example of a transmission apparatus according to an embodiment of the present invention.

FIG. 8 is a schematic structural diagram of still another example of a transmission apparatus provided by an embodiment of the present invention, and this specific embodiment of the present invention does not limit a specific implementation of the transmission apparatus. As shown in FIG. 8, the transmission apparatus 800 may include:

a processor (processor) 810, a communications interface (Communications interface) 820, a memory (memory) 830, and a communications bus 840.

The processor 810, the communications interface 820, and the memory 830 implement communication between each other through the communications bus 840.

The communications interface 820 is configured to communicate with a network element such as a client.

The processor 810 is configured to execute a program 832, and specifically may execute related steps in the method embodiment shown in FIG. 3.

Specifically, the program 832 may include program code, where the program code includes a computer operation instruction.

The processor 810 may be a central processing unit CPU, or an application-specific integrated circuit ASIC (Application Specific Integrated Circuit), or one or more integrated circuits configured to implement the embodiments of the present invention.

The memory 830 is configured to store the program 832. The memory 830 may include a high-speed RAM memory, and may also include a non-volatile memory (non-volatile memory), for example, at least one magnetic disk storage. The program 832 may be specifically configured to cause the transmission apparatus 800 to execute the following steps:

acquiring a scheduling instruction, wherein the scheduling instruction is used to instruct a user equipment to prepare for transmission;

acquiring a resource allocation message, wherein the resource allocation message is used to indicate an available carrier allocated to the transmission of the user equipment; and performing, in response to the resource allocation message, the transmission on the available carrier according to at least the scheduling instruction.

For the specific implementation of the steps in the program 832, refer to corresponding descriptions in the foregoing embodiments of corresponding steps and units, and details are not described herein again. It may be clearly understood by a person skilled in the art that, for the purpose of convenient and brief description, for a detailed working process of the foregoing device and module, refer to a corresponding process in the foregoing method embodiments, and details are not described herein again.

A person skilled in the art may clearly know that, for convenient and brief description, for the specific operating process of the foregoing device and module, reference may be made to the corresponding descriptions in the foregoing device embodiment, and no further details are provided herein.

Although a topic described herein is provided in common context executed with reference to executions of an operating system and an application program in a computer system, a person skilled in the art may know that another implementation may be executed with reference to a program module of another type. Generally, the program module comprises a routine, a program, a component, a data structure, and a structure of another type that execute a specific task or implement a specific abstract data type. A person skilled in the art may understand that, the topic described herein may be implemented by using configuration of another computer system, comprising a handheld device, a multi-processor system, a microprocessor-based or programmable consuming electronic product, a small-size computer, a mainframe computer or the like; or by using a distributed computer environment in which a task is executed by a remote processing device connected to a communications network. In the distributed computer environment, the program module may be located in local and remote storage devices.

A person of ordinary skill in the art may be aware that, with reference to the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and comprises several instructions for instructing a computer device (which may be a personal computer, a server, a network device, or the like) to perform all or some of the steps of the methods described in the embodiments of the present invention. The computer readable storage medium comprises a volatile and non-volatile, removable and non-removable medium that is implemented by using any method or technology used for storing information such as a computer readable instruction, a data structure, a program module, or other data. The computer readable storage medium specifically includes, but not limited to, a USB disk, a removable hard disk, a read-only memory (ROM, Read-Only Memory), a random access memory (RAM, Random Access Memory), an erasable programmable read-only memory (EPROM), an electrically erasable programmable read-only memory (EEPROM), a flash disk or another solid memory technology, a CD-ROM, a digital video disk (DVD), an HD-DVD, a blue-ray (Blue-Ray) or another optical storage device, a tape, disk storage or another magnetic storage device, or any other medium that can be used for storing required information and can be accessed by a computer.

The foregoing implementation manners are merely used for describing the present invention, rather than limiting the present invention. A person of ordinary skill in the art may made various changes and modifications without departing from the spirit and scope of the present invention, and therefore, all equivalent technical solutions shall belong to the scope of the present invention, and the protection scope of the present invention shall be subject to the claims.

What is claimed is:

1. A resource allocation method, comprising:

sending a scheduling instruction, wherein the scheduling instruction is used to instruct a user equipment to prepare for transmission at a scheduled transmission moment;

determining an available carrier in an unlicensed spectrum; and sending a resource allocation message to the user equipment, wherein the resource allocation message includes information for allocating the available carrier to the transmission of the user equipment at the scheduled transmission moment, wherein the scheduling instruction comprises information that is associated with a logical carrier allocated to the transmission of the user equipment, and the resource allocation message comprises information that is associated with a correspondence between the available carrier and the logical carrier.

2. The method of claim 1, wherein the resource allocation message comprises information that is associated with the available carrier allocated to the transmission of the user equipment.

3. The method of claim 1, further comprising:

allocating the logical carrier to the user equipment according to at least a transmission requirement.

4. The method of claim 1, wherein the sending a resource allocation message comprises:

sending the resource allocation message before a preset subframe after the scheduling instruction is sent.

5. The method of claim 4, further comprising:

sending a physical indication signal on the available carrier, wherein the physical indication signal is used to occupy the available carrier; and adding the resource allocation message to the physical indication signal for sending the resource allocation message.

6. A transmission method, comprising:
acquiring a scheduling instruction, wherein the scheduling instruction is used to instruct a user equipment to prepare for transmission at a scheduled transmission moment;
acquiring a resource allocation message by the user equipment, wherein the resource allocation message includes information indicating an available carrier allocated to the transmission of the user equipment; and
performing the transmission on the available carrier at the scheduled transmission moment according to at least the scheduling instruction,
wherein the scheduling instruction comprises information that is associated with a logical carrier allocated to the transmission of the user equipment, and
the resource allocation message comprises information that is associated with a correspondence between the available carrier and the logical carrier.

7. The method of claim 6, wherein
the resource allocation message comprises information that is associated with the available carrier allocated to the transmission of the user equipment.

8. The method of claim 6, wherein the acquiring a resource allocation message comprises:
receiving a physical indication signal associated with an unlicensed spectrum, wherein the physical indication signal is used to occupy the available carrier; and
parsing the physical indication signal to obtain the resource allocation message.

9. A resource allocation apparatus, comprising:
a first sending module configured to send a scheduling instruction, wherein the scheduling instruction is used to instruct a user equipment to prepare for transmission at a scheduled transmission moment;
a first determining module configured to determine an available carrier in an unlicensed spectrum; and
a first allocation module configured to send a resource allocation message to the user equipment, wherein the resource allocation message includes information for allocating the available carrier to the transmission of the user equipment at the scheduled transmission moment,
wherein the scheduling instruction sent by the first sending module comprises information that is associated with a logical carrier allocated to the transmission of the user equipment, and
the resource allocation message sent by the first allocation module comprises information that is associated with a correspondence between the available carrier and the logical carrier.

10. The apparatus of claim 9, wherein
the resource allocation message sent by the first allocation module comprises information that is associated with the available carrier allocated to the transmission of the user equipment.

11. The apparatus of claim 9, further comprising:
a second allocation module configured to allocate the logical carrier to the user equipment according to at least a transmission requirement.

12. The apparatus of claim 9, wherein the first allocation module is configured to send the resource allocation message before a preset subframe after the scheduling instruction is sent.

13. The apparatus of claim 12, further comprising:
a second sending module configured to send a physical indication signal on the available carrier, wherein the physical indication signal is used to occupy the available carrier,
wherein the first allocation module is configured to add the resource allocation message to the physical indication signal for sending the resource allocation message.

14. A transmission apparatus, comprising:
a first acquiring module configured to acquire a scheduling instruction, wherein the scheduling instruction is used to instruct a user equipment to prepare for transmission at a scheduled transmission moment;
a second acquiring module configured to acquire a resource allocation message by the user equipment, wherein the resource allocation message includes information indicating an available carrier allocated to the transmission of the user equipment; and
a transmission module configured to perform the transmission on the available carrier at the scheduled transmission moment according to at least the scheduling instruction,
wherein the scheduling instruction acquired by the first acquiring module comprises information that is associated with a logical carrier allocated to the transmission of the user equipment, and
the resource allocation message acquired by the second acquiring module comprises information that is associated with a correspondence between the available carrier and the logical carrier.

15. The apparatus of claim 14, wherein
the resource allocation message acquired by the second acquiring module comprises information that is associated with the available carrier allocated to the transmission of the user equipment.

16. The apparatus of claim 14, wherein the second acquiring module comprises:
a receiving unit configured to receive a physical indication signal associated with an unlicensed spectrum, wherein the physical indication signal is used to occupy the available carrier; and
an acquiring unit configured to parse the physical indication signal to obtain the resource allocation message.

17. A resource allocation apparatus, comprising:
a transceiver;
a memory configured to store an instruction; and
a processor configured to execute the instruction stored in the memory, wherein the instruction causes the processor to execute operations including:
sending a scheduling instruction by using the transceiver, wherein the scheduling instruction is used to instruct a user equipment to prepare for transmission at a scheduled transmission moment;
determining an available carrier in an unlicensed spectrum; and
sending a resource allocation message to the user equipment by using the transceiver, wherein the resource allocation message includes information for allocating the available carrier to the transmission of the user equipment at the scheduled transmission moment,
wherein the scheduling instruction comprises information that is associated with a logical carrier allocated to the transmission of the user equipment, and
the resource allocation message comprises information that is associated with a correspondence between the available carrier and the logical carrier.

18. A transmission apparatus, comprising:
a transceiver;
a memory configured to store an instruction; and
a processor configured to execute the instruction stored in the memory, wherein the instruction causes the processor to execute operations including:
acquiring a scheduling instruction by using the transceiver, wherein the scheduling instruction is used to instruct a user equipment to prepare for transmission at a scheduled transmission moment;
acquiring a resource allocation message by using the transceiver, wherein the resource allocation message includes information indicating an available carrier allocated to the transmission of the user equipment; and
performing the transmission on the available carrier at the scheduled transmission moment by using the transceiver according to at least the scheduling instruction,
wherein the scheduling instruction comprises information that is associated with a logical carrier allocated to the transmission of the user equipment, and
the resource allocation message comprises information that is associated with a correspondence between the available carrier and the logical carrier.

* * * * *